United States Patent
Sugimori et al.

[11] Patent Number: 5,885,845
[45] Date of Patent: Mar. 23, 1999

[54] METHOD FOR DETECTING INORGANIC HYDRIDES, INORGANIC HALIDES AND ORGANOMETALLIC COMPOUNDS IN A GAS USING COPPER HYDROXIDE

[75] Inventors: Yoshiaki Sugimori; Tadaharu Watanabe; Hitoshi Kikuchi; Fumitaka Endo, all of Yamanashi; Shinji Ichimura; Megumi Yoshida, both of Kawasaki; Hiroaki Imai, Yamanashi, all of Japan

[73] Assignee: Nippon Sanso Corporation, Tokyo, Japan

[21] Appl. No.: 94,702

[22] Filed: Jun. 15, 1998

Related U.S. Application Data

[60] Division of Ser. No. 867,790, Jun. 3, 1997, which is a continuation-in-part of Ser. No. 335,699, Dec. 23, 1994, abandoned.

[30] Foreign Application Priority Data

Dec. 22, 1993 [JP] Japan .................................. 5-324408

[51] Int. Cl.$^6$ ........................... G01N 21/00; G01N 21/78
[52] U.S. Cl. .............................. 436/164; 436/73; 436/76; 436/124
[58] Field of Search .................. 252/182.32, 182.33; 436/164, 124, 76, 73, 2

[56] References Cited

U.S. PATENT DOCUMENTS

| | | | |
|---|---|---|---|
| 3,812,652 | 5/1974 | Carr et al. ........................ | 55/68 |
| 3,969,482 | 7/1976 | Teller ................................ | 423/235 |
| 4,462,896 | 7/1984 | Kitagawa et al. ................. | 108/253 |
| 4,535,072 | 8/1985 | Kitayama et al. ................. | 502/411 |
| 4,784,837 | 11/1988 | Kitayama et al. ................. | 423/210 |
| 4,853,148 | 8/1989 | Tom et al. ......................... | 252/194 |
| 4,983,367 | 1/1991 | Denny et al. ..................... | 423/244 |
| 5,120,515 | 6/1992 | Audeh et al. ..................... | 423/210 |
| 5,213,767 | 5/1993 | Smith et al. ...................... | 422/177 |
| 5,417,934 | 5/1995 | Smith et al. ...................... | 422/177 |
| 5,512,262 | 4/1996 | Shimada et al. .................. | 423/245.1 |
| 5,531,971 | 7/1996 | Tom et al. ......................... | 423/210 |

FOREIGN PATENT DOCUMENTS

| | | |
|---|---|---|
| 0-294142 | 12/1988 | European Pat. Off. . |
| 50-139075 | 11/1975 | Japan . |
| 62-95199 | 5/1987 | Japan . |
| 63-72326 | 4/1988 | Japan . |
| 64-15135 | 1/1989 | Japan . |
| 2-110369 | 4/1990 | Japan . |
| 2-110370 | 4/1990 | Japan . |
| 3-64166 | 10/1991 | Japan . |
| 4-64167 | 10/1991 | Japan . |
| 4-17082 | 3/1992 | Japan . |
| 4-19886 | 3/1992 | Japan . |
| 4-97752 | 3/1992 | Japan . |
| 4-57368 | 9/1992 | Japan . |
| 4-79576 | 12/1992 | Japan . |
| 4-79577 | 12/1992 | Japan . |
| 4-79578 | 12/1992 | Japan . |
| 89-11905 | 12/1989 | WIPO . |

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

The present invention relates to a method of detecting harmful components selected from the group consisting of volatile inorganic hydrides, volatile inorganic halides and organometallic compounds. The harmful components can be detecting by bringing it into contact with a crystalline cupric hydroxide. The harmful components can be detected based on the color change of the copper hydroxide.

2 Claims, 5 Drawing Sheets

FIG. I
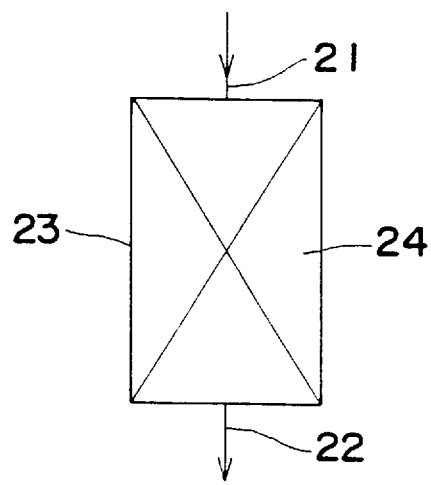
FIG. 2
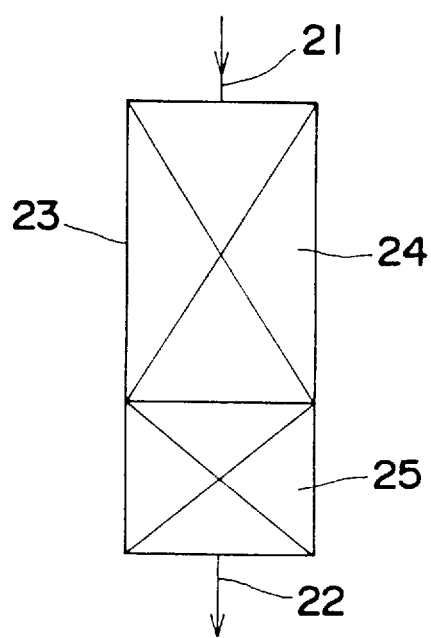

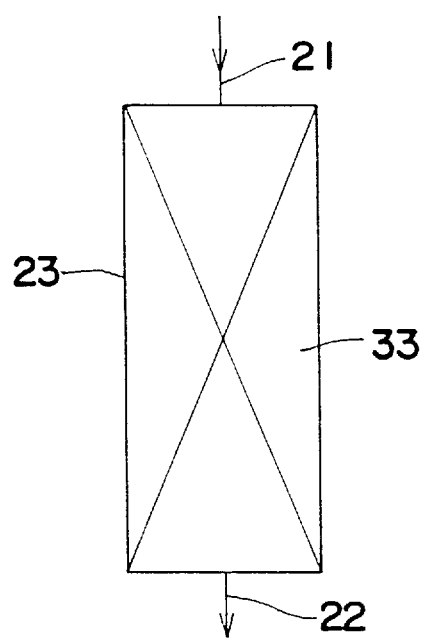

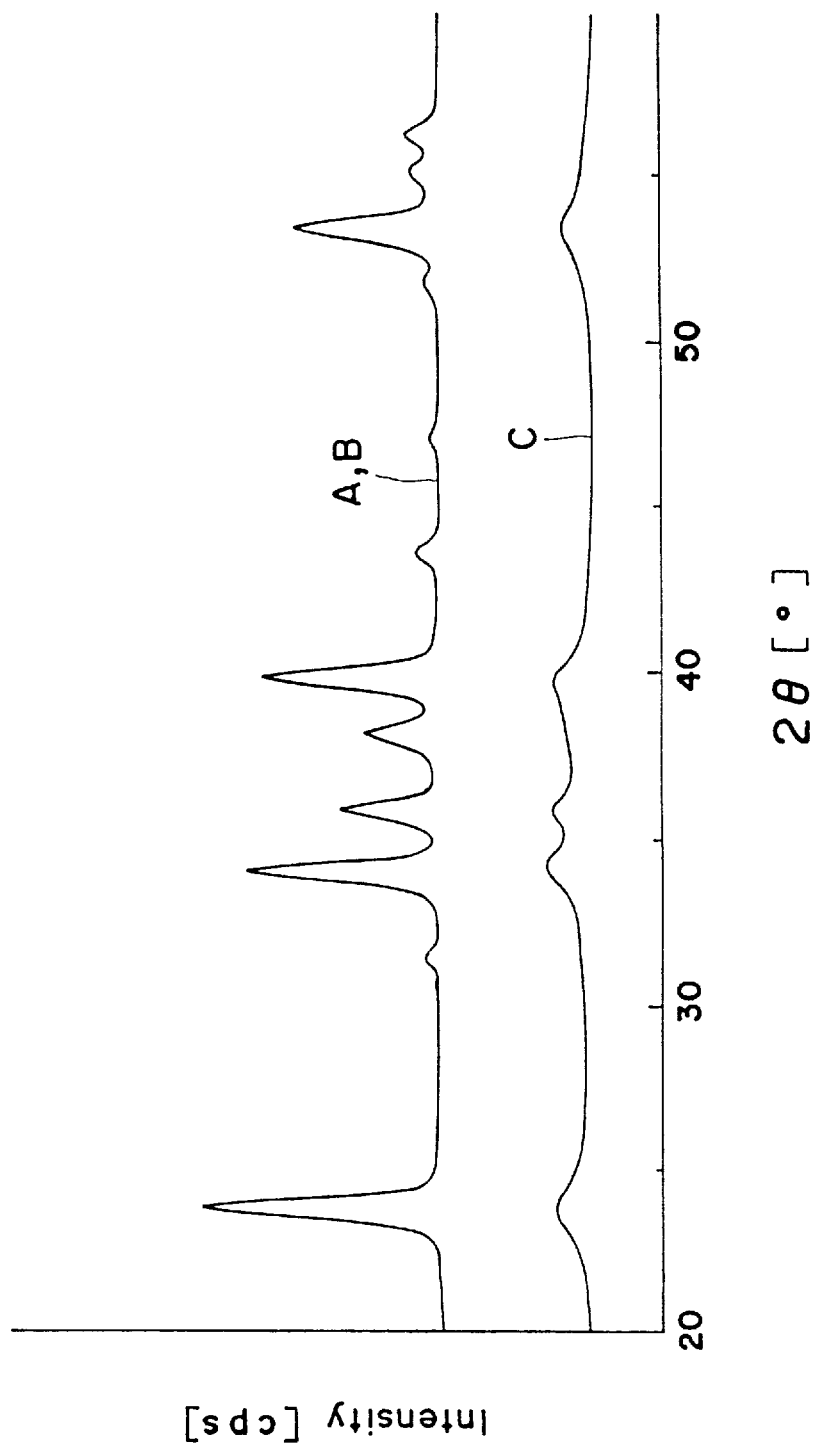

METHOD FOR DETECTING INORGANIC HYDRIDES, INORGANIC HALIDES AND ORGANOMETALLIC COMPOUNDS IN A GAS USING COPPER HYDROXIDE

This application is a division of prior application Ser. No. 08/867,790 filed Jun. 3, 1997, which is a continuation-in-part of Ser. No. 08/335,699, filed Dec. 23, 1994 (abandoned), which was a national stage application under § 371 of international application PCT/JP94/00431 filed Mar. 17, 1994. The entire contents of these applications are hereby incorporated by reference.

TECHNICAL FIELD

The present invention relates to a method of removing a harmful components selected from the group consisting of volatile inorganic hydrides, volatile inorganic halides and organometallic compounds and to a method of detecting the same, more particularly to a method of removing such harmful components contained in gases exhausted during the process of semiconductor manufacturing etc. and a method of detecting the same, as well as, to a removing apparatus and a detecting apparatus to be employed in these methods.

BACKGROUND ART

In the manufacture of semiconductors, material gases containing noxious gas components selected from the group consisting of volatile inorganic hydrides, volatile inorganic halides and organometallic compounds are used. Accordingly, the gases exhausted during the process of semiconductor manufacturing contain unused material gases as residues. Since these material gases, which have toxicity and flammability, are dangerous and harmful components, the harmful components contained in the exhaust gases must be removed before they are released into the atmosphere.

Referring to the treatment of removing such harmful components, the conventional wet treatment method using a scrubber and the like is recently being replaced by the dry treatment method.

For example, Japanese Patent Publication Nos. Hei 3-64166 and Hei 3-64167 disclose methods of removing arsenic by bringing arsenic-containing gases into contact with sorbents containing copper oxides as active ingredients. Japanese Patent Publication No. Hei 4-17082 discloses a method of removing a gaseous silicon compound by bringing a gas containing a gaseous silicon compound into contact with a sorbent containing a copper oxide or a mixture of a copper oxide and a zinc oxide as an active ingredient. Japanese Patent Publication No. Hei 4-57368 discloses a method of removing one or more harmful components contained in a gas, selected from arsine, phosphine, diborane and hydrogen selenide, into contact with a sorbent containing a mixture of a copper oxide and silicon oxide and/or aluminum oxide; and a method of removing a harmful component by bringing a gas containing diborane and/or hydrogen selenide as harmful components into contact with a sorbent containing a mixture of a copper oxide and a zinc oxide as an active ingredient. Japanese Patent Publication No. Hei 4-19886 discloses a method of removing a silane gas by bringing a gas containing a silane gas into contact with a sorbent containing a metal oxide as an active ingredient.

When various kinds of harmful components are to be removed using various types of sorbents as described above, a gas containing a harmful component is generally passed through a column packed with a sorbent so as to bring the harmful component into contact with the sorbent to be removed thereby. In this case, the performance of the sorbent gradually decreases as the treatment of removing the harmful components goes on, and the concentration of the harmful components contained in the gas passed through the sorbent exceeds a predetermined level to cause breakthrough of the sorbent. Accordingly, the sorbent must be renewed or replaced before breakthrough, so that various studies are made with a view to developing detecting agent which can easily and securely detect breakthrough of the sorbent.

Japanese Patent Publication Nos. Hei. 4-79576, 4-79577 and 4-79578 disclose, as detecting agents for detecting gases containing one or more harmful components selected, for example, from arsine, phosphine, diborane, hydrogen selenide, hydrogen sulfide, germane, monosilane, disilane and dicholrosilane, a detecting agent containing a basic copper carbonate as a color forming component, a detecting agent containing a copper salt of an organic acid as a color forming component and a detecting agent containing a mixture of a secondary copper salt and a palladium salt as color forming components, respectively. Japanese Unexamined Patent Publication (Kokai) No. Hei 4-97752 discloses, as a detecting agent for detecting a gas containing one or more harmful components selected from volatile inorganic hydrides such as arsine, phosphine, diborane and hydrogen selenide, a detecting agent containing copper nitrate as a color forming component. Japanese Unexamined Patent Publication (Kokai) Nos. Hei 2-110369 and 2-110370 disclose, as detecting agents for detecting gases containing one or more harmful components selected from carbon monoxide and/or metal carbonyl compounds, or alkyl compound of tin, tellurium cadmium, arsenic, mercury, aluminum, gallium and indium, a detecting agent containing a mixture of a secondary copper salt and a gold salt as a color forming component.

However, these conventional methods of removing harmful components using sorbents containing as active ingredients metal oxides such as copper oxides exhibit poor performances of removing silane. Accordingly, it is necessary to subject the sorbent to grain refining treatment and to increase the specific area thereof by allowing it to be carried on a carrier such as alumina, and besides the manufacture of the sorbent itself is troublesome. Under such circumstances, an advent of a sorbent which can show a higher performance of sorption has been desired. Further, the conventional sorbents require the additional use of a detecting agent for detecting exhaustion of the sorbent.

Meanwhile, the detecting agents described above employ expensive raw materials such as a palladium salt and a gold salt, and costly manufacturing processes including dissolution, precipitation, filtration and drying of the copper salt. The detecting agent containing copper nitrate as the color forming component can exhibit high detection performance, but it is liable to generate NOx if the reaction with the gas of interest goes on excessively.

Therefore, it is a first objective of the invention to provide a method which can exhibit sufficient performance of removing silane series harmful components and which can efficiently remove other harmful components selected from various kinds of volatile inorganic hydrides, various kinds of volatile inorganic halides and various kinds of organometallic compounds. It is a second objective of the invention to provide a detection method using sorbent having a capability of detecting breakthrough of the performance of removing these harmful components.

DISCLOSURE OF THE INVENTION

The present inventors made intensive studies to find that copper hydroxide exhibits a performance of sorption of about 4 times as high as those of conventional copper oxides against silane series noxious gases, it can also effectively remove other volatile inorganic hydrides, volatile inorganic halides and organometallic compounds and that these harmful components can be detected resorting to the clear color change of the copper hydroxide from blue into black based on the sorption reaction. Especially, crystalline cupric hydroxide has superior removing performance.

In the method of removing harmful components according to the present invention, a volatile harmful component selected from the group consisting of hydrides of Si, P, As, B, Se and Ge; and alkylates and alkoxides of B, Al, Si, P, Ti, Zn, Ga, Ge, As, Se, Zr, In, Sn and Ta; from a gas stream containing the harmful component is removed by contacting the gas stream with crystalline cupric hydroxide.

In a second method of removing harmful components according to the present invention, such harmful component is removed by contacting the gas stream with a metal oxide after it has been contacted with the crystalline cupric hydroxide.

In a third method of removing harmful components according to the present invention, such harmful component is removed by contacting the gas stream with a dehydrating agent after it has been contacted with the crystalline cupric hydroxide and then contacting the gas stream with a metal oxide.

Meanwhile the metal oxides include various kinds of metal oxides such as cupric oxide, $Mn_3O_4$, $Mn_2O_3$, $MnO_2$, $Fe_3O_4$ and $Fe_2O_3$.

As the dehydrating agent, a well-known one such as silica gel, alumina, zeolite, calcium chloride, phosphorus pentoxide, etc. can be employed.

In the method of detecting harmful components according to the present invention, a harmful component is detected by bringing it into contact with a copper hydroxide.

As described above, the harmful components to be removed according to the present invention are selected from the group consisting of volatile inorganic hydrides, volatile inorganic halides and organometallic compounds, and typically include, for example, those contained in the material gases employed in the semiconductor manufacturing processes.

The volatile inorganic hydrides can be exemplified by diborane, silane, disilane, germane, ammonia, phosphine, arsine, hydrogen sulfide, hydrogen selenide, etc.

The volatile inorganic halides include various gases including halogen gases, typically boron trifluoride, boron trichloride, silicon tetrafluoride, dichlorosilane, trichlorosilane, silicon tetrachloride, trichloroarsine, tungsten hexafluoride, fluorine, chlorine, hydrogen fluoride, hydrogen chloride, hydrogen bromide, etc.

The organometallic compounds can be exemplified by those containing alkyl groups, such as dimethyl zinc, diethyl zinc, trimethyl aluminum, triethyl aluminum, trimethyl gallium, triethyl gallium, trimethyl indium, triethyl indium, tetramethyl tin, tetraethyl tin, tertiary-butyl phosphine, trimethyl arsine, triethyl arsine and tertiary-butyl arsine; and those containing alkoxide groups, such as dimethoxy zinc, tributoxy gallium, trimethoxy boron, triethoxy boron, tetramethoxy silane, tetraethoxy silane, tetramethoxy germanium, tetraethoxy germanium, tetratertiary-butoxy tin, trimethoxy phosphine, triethoxy phosphine, trimethoxy arsine, triethoxy arsine, tetraethoxy selenium, tetramethoxy titanium, tetraethoxy titanium, tetraisopropoxy titanium, tetraisopropoxy zirconium, tetratertiary-butoxy zirconium, pentamethoxy tantalum, pentaethoxy tantalum, etc.

If a gas containing such harmful components is brought into contact with crystalline cupric hydroxide ($Cu(OH)_2$), the harmful components contained in the gas react with the cupric hydroxide and are removed thereby. In this case, the reaction is of exothermic, the quantity of heat to be generated is substantially equal to that generated when copper oxide is used, which has conventionally been used as the sorbent.

Further, the cupric hydroxide may be mixed with cuprous hydroxide.

While the copper hydroxide employable in the detecting method may either be of crystalline or noncrystalline, the crystalline copper hydroxide has higher stability to heat than noncrystalline copper hydroxide, so that the former can be used more stably when the concentration of the harmful component is high and a high heat of reaction is to be generated. Accordingly, a crystalline cupric hydroxide is preferably used as the copper hydroxide.

Meanwhile, the copper hydroxide is preferably used in the presence of a stabilizer. As such a stabilizer, at least one simple substance selected from the group consisting of beryllium, magnesium, transition metals, (e.g. vanadium, molybdenum, cobalt, nickel and zinc), boron, aluminum, silicon, lead, antimony, bismuth; or at least one compound selected from oxides, hydroxides, hydrogencarbonates, hydrogensulfates, hydrogenphosphates, sulfides, peroxides, halides (e.g. chlorides, bromides and iodides), carboxylates (e.g. acetates, formates and oxalates), and oxy acid salts (e.g. sulfates, nitrates, carbonates, oxide-hydroxides, oxide-hydrides, phosphates, sulfites, nitrites, molybdates, borates, silicates, aluminates, thiosulfates and chromates) of such elements can be employed.

Specific examples of the stabilizers include beryllium hydroxide, magnesium oxide, magnesium hydroxide, basic magnesium carbonate, magnesium sulfate, vanadium pentoxide, molybdenum trioxide, cobalt carbonate, nickel oxide, nickel hydroxide, basic nickel carbonate, nickel sulfate, basic copper carbonate, zinc oxide, boron oxide, boric acid, active alumina, amorphous silica, lead monoxide, lead monoxide hydrate, antimony oxide, bismuth oxide, etc.

While the amount of the stabilizer varies depending on the kind of the substance used as the stabilizer, the shape of the copper hydroxide used as the major component, etc., generally it is suitably used in an amount of about 0.01 to 70% by weight based on the amount of the copper hydroxide. If the amount of the stabilizer is too great, the efficiency of removing the harmful component is lowered, whereas if it is too small, the stabilizing effect may insufficiently be exhibited.

As described above, if a gas containing such harmful components is brought into contact with copper hydroxide, the harmful components contained in the gas can be removed through reaction with the copper hydroxide. Particularly in the case of silane, the amount of silane to be removed per unit weight of the copper hydroxide, which is the major component of the reaction, is considerably great compared with the case of the copper oxide used conventionally as the sorbent. There are many conceivable reasons for that. For one thing, the proportion of the sorbent components which participate in the reaction seems to be higher in the case of copper hydroxide than in the case of copper oxide. For example, in the case of copper oxide, if the copper oxide is pulverized into a micropowder and allowed to be carried on a carrier so as to provide greater specific surface area, the diameter of the individual copper oxide particle is on the order of several microns at the minimum. Meanwhile, the reaction takes place on the order of several angstroms of the surface (the thickness corresponding to $\frac{1}{1000}$ of the diameter), so that only the surface of the substance eventually participates in the reaction, and the internal copper oxide remains unreacted. On the other hand, in the case of copper hydroxide, it can be assumed that copper hydroxide allows the reaction to go on to the internal portion of the substance. Actually, in the case of copper hydroxide, a large amount of silane can be removed even if the copper hydroxide has a small specific surface area. Accordingly, copper hydroxide, whether it is carried on a carrier or is used singly in the form of tablet, can fully exhibit the performance of sorption.

Meanwhile, the copper hydroxide reacts delicately with the harmful component upon contact therewith, even if it is present at a very low concentration, and undergoes color change from blue to black. Accordingly, exhaustion of the copper hydroxide used as the sorbent can be confirmed by monitoring the process of color change occurring therein. More specifically, if the copper hydroxide is packed into a column made of a transparent material or a column having a transparent window, the process that the boundary between the exhausted sorbent and fresh sorbent moves from the stream side can be observed based on the color change, so that the time that the sorbent should be replaced can be known in advance.

Thus, there is no need of additionally using a detecting agent. The copper hydroxide can also be used independently as the detecting agent for detecting these harmful components.

The copper hydroxide may be used singly or in admixture with other components. The performance of the copper hydroxide can further be improved by subjecting it to the same grain refining treatment as practiced conventionally, and allowing the thus treated copper hydroxide to be carried on a carrier such as alumina, silica and diatomaceous earth so as to increase the specific surface area.

It should be noted that the conventional sorbents containing the copper oxides as the major components are essentially different from the sorbent of the invention in that the former sometimes contains small amounts of residual copper hydroxides, and such copper hydroxide residues are present merely as impurities and that the latter contains the copper hydroxide as an active ingredient of the sorbent or the detecting agent.

While the copper hydroxide exhibits by itself excellent performance in removing or detecting the harmful components, it swiftly undergoes a pyrolytic reaction at about 130° C. Accordingly, if the copper hydroxide is used singly for the removal or detection of harmful components, it is liable to be heated by the heat of reaction with the harmful components to reach the heat decomposition temperature. The copper hydroxide sometimes undergoes spontaneous oxidation depending on the state of storage even at a temperature lower than the heat decomposition temperature to have reduced performance of sorption. Thus, with a view to achieve removal or detection more practically and under high stability to heat, a formulation which can inhibit the pyrolytic reaction of the copper hydroxide is desired. The present inventors extensively repeated experiments and discussions to find that a highly practical sorbent or detecting agent having excellent storage stability which can inhibit pyrolytic reaction can be obtained by admixing the stabilizer to the copper hydroxide.

While the copper hydroxide can react with a large amount of the harmful components, the residual amount of the harmful components after completion of the reaction treatment may sometimes be great compared with the case of the conventional sorbents, i.e. metal oxides, depending on the conditions under which the copper hydroxide is used. On the other hand, while the metal oxide sorbent can remove the harmful components to a trace, the amount of the harmful components which can be treated until breakthrough of the sorbent is small.

Accordingly, if a gas containing a harmful component is brought into contact with the copper oxide to remove the harmful components as a pretreatment, and then the gas having a reduced content of the harmful component is brought into contact with the metal oxide to allow the metal oxide to treat the low-concentration harmful component, extended use of the sorbents can be realized rather than the single use of the metal oxide as the sorbent. Meanwhile, even if the copper hydroxide should fail to fully carry out the removal treatment depending on the conditions under which it is used, the harmful component can securely be removed through the latter reaction with the metal oxide.

The copper hydroxide may sometimes form water through the reaction with the harmful components to lower the performance of sorption of the metal oxide used in the latter reaction step, so that when the harmful components of interest formed water through reaction with the copper hydroxide, the water contained in the gas passed through the copper hydroxide is desirably removed over a dehydrating agent before it is brought into contact with the metal oxide.

Further, while the copper hydroxide, the dehydrating agent and the metal oxide are preferably packed respectively in separate columns or in the form of layers in the same column, the harmful components can efficiently be removed even if the harmful component is brought into contact with the mixture of the copper hydroxide and the metal oxide. Usually, if these two components are mixed, the mean value of the two may usually appear to be the performance of sorption of the mixture, but the mixture exhibits a synergistic effect and the amount of the harmful component to be treated therewith increases compared with the case where either the copper hydroxide or the metal oxide is used singly. It should be noted here that water may sometimes be formed in the mixed sorbent depending on the kind of the harmful component, so that a dehydrating agent is desirably admixed, as necessary.

As has been described heretofore, the present invention enables efficient removal of the harmful components and can achieve downsizing of the removing apparatus or extension of the replacement cycle of the sorbent. Further, since the copper hydroxide exhibits a sufficient performance of sorption in spite of its small specific surface area, it need not be subjected to grain refining treatment or carried on a carrier, leading to the reduction of the production cost of the sorbent itself. Thus, the sorbent of the invention brings about an extremely great implemental effect.

In addition, since the copper hydroxide undergoes color change upon reaction with the harmful components, possible exhaustion of the sorbent can be found out by observing the process of the color change, and thus the time when the sorbent should be replaced can securely be known. Besides, the color change of the copper hydroxide can also be utilized for the detection of the harmful components.

BRIEF DESCRIPTION OF THE DRAWINGS

FIGS. 1–7 show the examples of a removing apparatus employed in the removing method of the present invention.

FIG. 1 shows an explanatory view of a harmful component-removing apparatus comprising a column and a crystalline cupric hydroxide packed therein;

FIG. 2 shows an explanatory view of a harmful component-removing apparatus comprising a column and a crystalline cupric hydroxide and a metal oxide packed therein in the form of layers;

FIG. 3 shows an explanatory view of a harmful component-removing apparatus comprising a column and a crystalline cupric hydroxide, a dehydrating agent and a metal oxide packed therein in the form of layers;

FIG. 4 shows an explanatory view of a harmful component-removing apparatus comprising separate columns packed respectively with a crystalline cupric hydroxide, a dehydrating agent and a metal oxide;

FIG. 5 shows an explanatory view of a harmful component-removing apparatus comprising a column packed with a mixture of a crystalline cupric hydroxide and a dehydrating agent and a column packed with a metal oxide;

FIG. 6 shows an explanatory view of a harmful component-removing apparatus comprising a column packed with a crystalline cupric hydroxide and a column packed with a mixture of a metal oxide and a dehydrating agent;

FIG. 7 shows an explanatory view of a harmful component-removing apparatus comprising a column, and a mixture of a crystalline cupric hydroxide and a metal oxide or such mixture further containing a dehydrating agent packed therein; and FIG. 8 shows an X-ray chart of three kinds of cupric hydroxides employed in the embodiments.

BEST MODE FOR CARRYING OUT THE INVENTION

Figure 3:
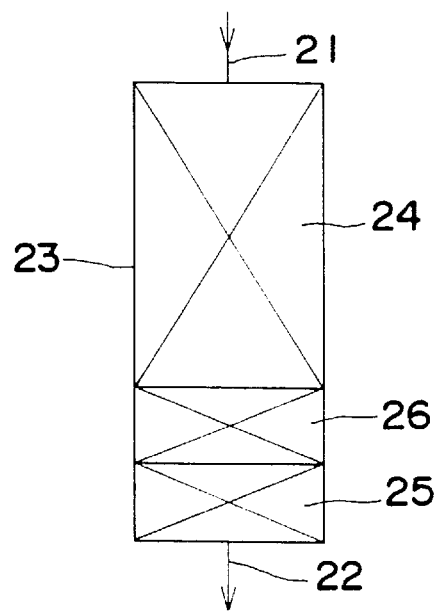

Embodiments of the present invention will now be described.

EXAMPLE 1

The following materials were prepared as the sorbents and sample gases, and these sorbents were packed to a height of 300 mm in columns having an inner diameter of 43 mm and a height of 685 mm, respectively. Sample gases containing silane as the harmful component were passed through these columns to bring silane into contact with the sorbents and the treating performances of the sorbents were determined, respectively. The determination of the treating performance of each sorbent was carried out by measuring the silane concentration at the gas outlet of the column using a detector (Analyzer AD 10, manufactured by Nippon Sanso Corporation), and calculating the amount of silane treated per 1 Kg of the sorbent based on the charge amount of silane and the amount when the sorbent reaches the limit of duration, provided that the limit of duration of the sorbent is when the silane concentration at the gas outlet reaches 5 ppm. The specific surface area of each sorbents was measured according to the well-known BET method.

The sorbents employed include:
A: A molded product of a commercially available cupric hydroxide powder (manufactured by Kanto Kagaku),
B: A molded product prepared by drying a precipitate (cupric hydroxide) formed by mixing a 1 mole/lit copper sulfate solution and a 1 mole/lit sodium hydroxide solution,
C: A molded product prepared by drying a precipitate (cupric hydroxide) formed by mixing a 1 mole/lit copper sulfate solution and a 10 mole/lit sodium hydroxide solution,
D: A molded product of a commercially available cupric oxide powder (manufactured by Kanto Kagaku),
E: A molded product of cupric oxide prepared by baking a basic copper carbonate, and
F: Cupric oxide-on-aluminum oxide prepared by baking a precipitate formed by mixing three aqueous solutions of copper nitrate, aluminum nitrate and sodium carbonate.

It should be noted that the sorbents A, B and C are cupric hydroxides, both the sorbent A and the sorbent B are of crystalline, because peaks are large and the sorbent C is non-crystalline, because small peaks disappear as shown in FIG. 8. The molded products were prepared by means of extrusion and each has a diameter of 1.5 mm and a length of 5 mm.

The sample gases include:
G1: A nitrogen-based gas having a silane concentration of 1%; flow rate 1.0 lit/min
G2: A nitrogen-based gas having a silane concentration of 10%; flow rate 0.1 lit/min The results of treating performance determination carried out for the respective sorbent are summarized in Table 1.

TABLE 1

| Sorbent | Specific surface area $[m^2/g]$ | Silane treating performance [l/kg] | |
|---|---|---|---|
| | | G1 | G2 |
| A | 60 | 125 | 140 |
| B | 60 | 128 | 135 |
| C | 63 | 60 | 62 |
| D | 10 | 2.9 | 3.0 |
| E | 32 | 13 | 14 |
| F | 120 | 22 | 24 |

As clearly shown in Table 1, it can be seen that the sorbents A and B each comprising a crystalline cupric hydroxide have extremely high treating performances over the sorbent C comprising a non-crystalline cupric hydroxide, and over the conventional sorbents D, E and F. The specific surface area of these conventional sorbents must be increased in order to secure necessary and sufficient treating performance. For such purpose, the specific area of the conventional sorbent must be increased, for example, by making the grain size as small as possible, and allowing it to be carried on a carrier. However, the sorbents comprising cupric hydroxide each can exhibit a treating performance of at least five times as high as that of the conventional sorbent F having the greatest specific surface area among other conventional sorbents, in spite of the fact that the former has a specific surface area of half as much as that of the latter, so that sufficient performance can be exhibited without being subjected to any special treatment of increasing the surface area. Accordingly, the column to be packed with the sorbent can be downsized, and also the replacement cycle of the sorbent can be extended.

EXAMPLE 2

The same cupric hydroxide powder as used in the sorbent A of Example 1 was molded into pellets having a diameter of 1 mm and a length of 3 mm, and about 220 g of the thus formed pellets were packed to a transparent column having an inner diameter of 40 mm and a height of 500 mm (length of the packed bed of the pellet: 150 mm). After the column was purged with a nitrogen gas, a nitrogen-based sample gas having a silane concentration of 1% was passed through the column at a flow rate of 750 ml/min (space velocity: 1.0 cm/sec) under constant monitoring of the gas from the gas outlet of the column using a cold atomic adsorption gas monitor. The packed bed underwent color change from blue to black with time from upstream toward downstream, and movement of the blue-black color change frontier was observed. After 3,670 minutes from the starting of gas passage, the position of the color change frontier reached about 10 mm from the bottom of the packed bed, and the silane concentration of the gas at the gas outlet amounted to 5 ppm. The amount of silane treated at that time was 125 lit/kg.

If the packed bed of the crystalline cupric hydroxide is allowed to be visible when it is used as the sorbent for silane according to this Example, exhaustion of the sorbent can be detected simultaneously with the removal of silane, so that no additional use of a detecting agent becomes necessary.

Meanwhile, when removal of silane is to be carried out using a column made of a material which does not allow the inside of the column to be visible, and packed with the sorbent comprising the crystalline cupric hydroxide, exhaustion of the sorbent can be detected in advance by providing a visual observation window having a length of 10 mm or more at the downstream extremity of the packed bed in the column or by connecting serially a transparent column packed with cupric hydroxide to a height of 10 mm or more on the downstream side of the former packed bed. Meanwhile, when a sorbent having no capability of self-detecting its exhaustion, the cupric hydroxide can be used as the exhaustion detecting agent.

EXAMPLE 3

The same procedures as in Example 2 were repeated except that a hydrogen-based gas having an arsine concentration of 1% was used as the sample gas and that the gas from the gas outlet of the column was monitored using the same detector as used in Example 1. Consequently, the packed bed underwent color change from blue to black with time from upstream toward downstream, and movement of the color change frontier was observed. After 4,550 minutes from the starting of gas passage, the position of the color change frontier reached about 10 mm from the downstream extremity of the packed bed, and the arsine concentration of the gas at the gas outlet amounted to 0.05 ppm. The amount of arsine treated at that time was 155 lit/kg.

EXAMPLE 4

The same procedures as in Example 3 were repeated except that a hydrogen-based gas having a phosphine concentration of 1% was used as the sample gas. Consequently, after 3,870 minutes from the starting of gas passage, the position of the color change frontier reached about 10 mm from the downstream extremity of the packed bed, and the phosphine concentration of the gas at the gas outlet amounted to 0.3 ppm. The amount of phosphine treated at that time was 132 lit/kg.

EXAMPLE 5

The same procedures as in Example 3 were repeated except that a nitrogen-based gas having a tertiary-butyl arsine (TBA) concentration of 1% was used as the sample gas. Consequently, after 2,640 minutes from the starting of gas passage, the position of the color change frontier reached about 10 mm from the downstream extremity of the packed bed, and the TBA concentration of the gas at the gas outlet amounted to 0.03 ppm. The amount of TBA treated at that time was 90 lit/kg.

EXAMPLE 6

To 1000 g of a commercially available crystalline cupric hydroxide, was added 400 g of water, and the resulting mixture was blended well, followed by granulation using an extruder to provide pellets having a diameter of 1.5 mm and a length of 5 mm, which were dried at 70° C. for 3 hours and then allowed to cool to provide a sample comprising cupric hydroxide only. Meanwhile, to 1000 g of the cupric hydroxide, were added various substances as indicated in Table 2, respectively, in an amount of 300 g and 400 g of water, and after the resulting mixtures were blended well, the thus obtained mixture was pelletized in the same manner as described above to provide samples comprising the cupric hydroxide and the substances indicated in Table 2, respectively. Each of the samples thus obtained was maintained at 100° C. to examine the process of color change from blue to black. The results are shown in Table 2. In Table 2, "<1" means one hour or less, and "5<" means 5 hours or more.

TABLE 2

| No. | Substance added | Time until color change |
|---|---|---|
| 0 | None | 1 |
| 1 | Lithium carbonate | <1 |
| 2 | Sodium hydroxide | <1 |
| 3 | Pottassium carbonate | <1 |
| 4 | Beryllium hydroxide | 3 |
| 5 | Magnesium | 5< |
| 6 | Magnesium oxide | 5< |
| 7 | Magnesium hydroxide | 5< |
| 8 | Basic magnesium carbonate | 5< |
| 9 | Calcium carbonate | 1 |
| 10 | Strontium hydroxide | 1 |
| 11 | Barium carbonate | 1 |
| 12 | Cerium Oxide | 1 |
| 13 | Titanium Oxide | 1 |
| 14 | Zirconium oxide | 1 |
| 15 | Vanadium oxide | 2 |
| 16 | Chromium Hydroxide | 1 |
| 17 | Molybdenum oxide | 3 |
| 18 | Manganese dioxide | <1 |
| 19 | Ferric oxide | <1 |
| 20 | Cobalt carbonate | 5< |
| 21 | Nickel | 5< |
| 22 | Nickel oxide | 3 |
| 23 | Nickel hydroxide | 5< |
| 24 | Basic nickel carbonate | 4 |
| 25 | Nickel sulfate | 5< |
| 26 | Zinc oxide | 3 |
| 27 | Cadmium carbonate | 1 |
| 28 | Boron oxide | 5< |
| 29 | Boric acid | 5< |
| 30 | Aluminum | 5< |
| 31 | Active alumina | 5< |
| 32 | Silica gel | 5< |
| 33 | Tin oxide | 1 |
| 34 | Lead | 2 |
| 35 | Lead monoxide | 5< |
| 36 | Antimony oxide | 5< |
| 37 | Bismuth oxide | 5< |

In Table 2, in the case of Sample No. 0 containing crystalline cupric hydroxide only, it can be seen that color change from blue to black occurred in about 1 hour due to the pyrolytic reaction caused by the heating. Meanwhile, in Sample Nos. 1, 2 and 3 each containing an alkali metal compound, the color change started in 1 hour or less, showing low heat stability compared with the sample containing cupric hydroxide only. Likewise, Sample Nos. 9, 10 and 11 containing calcium, strontium and barium compounds respectively underwent color change in 1 hour which is almost comparable to the sample containing cupric hydroxide only, showing no effect as the stabilizer.

In each of the samples to which the other substances are added, respectively, the time until color change occurs was extended, and these substances added respectively as the stabilizers to cupric hydroxide exhibit the effect of inhibiting pyrolytic reaction of cupric hydroxide. Particularly, Sample Nos. 6, 7 and 8 to which magnesium compounds are added respectively as well as Sample No. 5 to which a metal magnesium is added all underwent no color change in 5 hours, demonstrating notable effects. The samples which took 2 or more hours for the pyrolysis can preferably be used as the stabilizers, and those which took 5 or more hours are more preferred.

EXAMPLE 7

To 1 kg of cupric hydroxide powder, were added 400 g of water and 100 g of lead monoxide as a stabilizer, and after the resulting mixture was blended well, the mixture was granulated using an extruder to provide pellets (sample A) having a diameter of 1.5 mm and a length of 5 mm. Pellets (sample B) containing cupric hydroxide powder only were prepared in the same manner as described above. These samples were placed in a thermostatic chamber maintained at 100° C. to examine degradation. The sample B started blackening in 1 hour, but the sample A did not undergo color change even after 10 hours.

Next, when these samples were kept in a 25° C. thermostatic chamber for 6 months, fading of the blue of the sample B was observed with time, and the sample B became blackish after 6 months. However, the sample A showed no color change. The amount of silane to be removed by these samples after storage at 25° C. for 6 months were determined in the same manner as in Example 1 using a nitrogen-based sample gas having a silane concentration of 1%. Consequently, the amount of silane treated by the sample A was 114 lit/kg, and that of the sample B was 55 lit/kg. Namely, it can be appreciated that the amount of silane which can be removed by the sample B containing cupric hydroxide only was approximately halved, demonstrating deteriorated performance after the long-term storage. However, the sample A admixed with lead monoxide reproduced the result of Example 1, demonstrating substantially intact performance even after the long-term storage.

EXAMPLE 8

The same procedures as in Example 7 were repeated except that lead monoxide was replaced by 50 g of antimony hydroxide to provide a sample C. When the sample C and the sample B of Example 7 were kept at 50° C. for 1 month, the sample B underwent blackening, but no color change was observed in the sample C. When the amounts of silane which can be removed by these two samples were determined, the amount of silane treated by the sample C was 120 lit/kg, whereas that of the sample B was 45 lit/kg.

EXAMPLE 9

The following materials were prepared as the sorbents, dehydrating agent and sample gases. Incidentally, the "molded products" referred to below means pellets each having a diameter of 1.0 mm and a length of 5 mm formed using an extruder. The performance of sorption of each sorbent was determined by calculating the amount of the harmful component treated per 1 Kg of the sorbent based on the charge amount of sample gas until the sorbent reaches the limit of duration, provided that the limit of duration of the sorbent is when the content of the harmful component contained in the gas after the removing treatment reaches the tolerable concentration as shown below.

The sorbents employed are two kinds of copper hydroxide sorbents:

A: A molded product of a commercially available cupric hydroxide powder (manufactured by Kanto Kagaku), and B: A molded product prepared by drying a precipitate (cupric hydroxide) formed by mixing a 1 mole/lit copper sulfate solution and a 1 mole/lit sodium hydroxide solution; and four metal oxide sorbents:

D: A molded product of a commercially available cupric oxide powder (manufactured by Kanto Kagaku), F: Cupric oxide-on-alumina prepared by baking a precipitate formed by mixing three aqueous solutions of copper nitrate, aluminum nitrate and sodium carbonate (the amount of cupric oxide being about 30% of the total amount), G: A molded product of a commercially available $Fe_2O_3$ (manufactured by Kanto Kagaku), and H: A molded product of a commercially available manganese dioxide (manufactured by Kanto Kagaku).

The dehydrating agent employed is a commercially available granular silica gel (S).

The sample gases contained respectively as harmful components:

silane (tolerable concentration: 5 ppm), arsine (tolerable concentration: 0.05 ppm), phosphine (tolerable concentration: 0.3 ppm) and TBA (tolerable concentration: 0.025 ppm, provided that the concentration is a conversion from the tolerable concentration of arsine contained in TBA).

The concentrations and flow rates of the respective sample gases are:

G3: A nitrogen-based gas having a harmful component concentration of 1%; flow rate 1.0 lit/min, and G4: A nitrogen-based gas having a harmful component concentration of 5%; flow rate 5 lit/min The silane treating performances of the following sorbents:

a mixed sorbent (A+F) prepared by mixing the cupric hydroxide sorbent A and the metal oxide sorbent F at a volume ratio of 5:1;

a mixed sorbent (A+F+S) prepared by mixing the cupric hydroxide sorbent A, the metal oxide sorbent F and the dehydrating agent S at a volume ratio of 5:1:1; and the cupric hydroxide sorbents A and B, the metal oxide sorbents D and F when used singly were determined. Incidentally, each sorbent was packed in a column having an inner diameter of 43 mm to a packed bed length of 300 mm. The results are summarized in Table 3.

TABLE 3

| Sorbent | Silane treating performance [lit/kg] | |
| --- | --- | --- |
|  | G3 | G4 |
| A | 130 | 30 |
| B | 125 | 32 |
| D | 6 | 3 |
| F | 20 | 8 |
| A + F | 133 (100) | 48 (36) |
| A + F + S | 130 (87) | 55 (37) |

In Table 3, the treating performance is indicated by the value of silane relative to the amount of the sorbent used (copper hydroxide and/or copper oxide), and the parenthesized numerals are the values relative to the total amount of the sorbents used (total weight including the alumina carrier and the dehydrating agent) (The same shall apply to the following Tables 4 and 5.).

As shown in Table 3, the cupric hydroxide sorbents A and B exhibit notably great silane treating performances compared with the copper oxide sorbents D and F even when the formers are used singly. It can be seen that in the mixed sorbent containing the cupric hydroxide sorbent A and the metal oxide sorbent F, no remarkable effect can be recognized when a low concentration and low flow rate gas, like the sample gas G3, is treated thereby, but this mixed sorbent exhibits an improved treating performance when a high concentration and high flow rate of gas, like the sample gas G4, is treated thereby. Further, since the mixed sorbent also showed a high parenthesized values relative to the total amount of the sorbents, the use of the mixed sorbent (A+F) can reduce the total amount of the sorbent and also realize downsizing of the apparatus or extension of the life of the column. It can be also seen that the additional use of the dehydrating agent S as a third component can further improve the performance of treating a high-concentration and high-flow rate gas.

EXAMPLE 10

The cupric hydroxide sorbent A, the dehydrating agent S and the metal oxide sorbent F were packed in a column (an inner diameter: 43 mm) in the form of layers, and sample gases were passed therethrough, respectively, to determine the treating performance of the layered sorbent. The results are summarized in Table 4 together with the treating performance of the cupric hydroxide sorbent A used singly. The unit of the treating performance is [lit/kg]. Incidentally, the height of the packed bed when the cupric hydroxide sorbent A only was used was 300 mm; and when the cupric hydroxide sorbent and the metal oxide sorbent F were packed in the form of layers, the height of the former was 250 mm and that of the latter was 50 mm. When the cupric hydroxide sorbent A, the dehydrating agent S and the metal oxide sorbent F were packed in the form of layers, the heights of these three packed beds were 215 mm, 42.5 mm and 42.5 mm, respectively.

TABLE 4

| Sorbent | Silane | | Arsine | | Phosphine | | TBA | |
| --- | --- | --- | --- | --- | --- | --- | --- | --- |
| | G3 | G4 | G3 | G4 | G3 | G4 | G3 | G4 |
| A | 130 | 30 | 147 | 25 | 120 | 20 | 81 | 10 |
| A + F | 145 | 60 | 151 | 50 | 125 | 43 | 85 | 25 |
| | (110) | (45) | (104) | (34) | (88) | (31) | (58) | (11) |
| A + S + F | 160 | 89 | 162 | 88 | 140 | 63 | 92 | 58 |
| | (115) | (65) | (113) | (61) | (98) | (44) | (63) | (40) |

As apparent from Table 4, if an exhaust gas is brought into contact successively with the layer of cupric hydroxide sorbent A and the layer of the metal oxide sorbent F, an improved silane treating performance can be exhibited over Example 9 where a mixture of the two is employed. The dehydrating agent S interposed between these two layers can further improve the treating performance.

Moreover, it can be seen, with respect to the other harmful components, that the layered cupric hydroxide sorbent A and the metal oxide sorbent F can exhibit improved treating performance over the case where the cupric hydroxide sorbent A is used singly.

EXAMPLE 11

Columns (inner diameter: 43 mm) packed with various metal oxide sorbents respectively were arranged on the downstream side of columns (inner diameter: 43 mm) packed with the cupric hydroxide to determine silane treating performances, respectively. The results are summarized in Table 5. The unit of treating performance is [lit/kg]. Incidentally, the silane-containing gas is of the same conditions as the sample gas G4, and the height of the packed bed of the cupric hydroxide sorbent A and that of the respective metal oxide sorbents were 250 mm and 50 mm, respectively.

TABLE 5

| Sorbent | Treating performance | Sorbent | Treating performance |
| --- | --- | --- | --- |
| $Cu(OH)_2$ only | 30 | +MgO | 31 |
| +CuO | 39 | +CaO | 31 |
| +$MnO_2$ | 65 | +NiO | 31 |
| +$Mn_2O_3$ | 57 | +ZnO | 32 |
| +$Mn_3O_4$ | 60 | +$SiO_2$ | 30 |
| +MnO | 30 | +$TiO_2$ | 32 |
| +$Fe_2O_3$ | 38 | +$Cr_2O_3$ | 32 |
| +$Fe_3O_4$ | 37 | | |
| +FeO | 30 | | |

As shown in Table 5, it can be seen that, with respect to the silane treating performance, $Fe_2O_3$ G and manganese dioxide H exhibit the similar effect to copper oxide.

Next, the apparatus for removing harmful components and the apparatus for detecting the same according to the methods of the present invention will be described referring to FIGS. 1 to 7.

FIG. 1 shows an apparatus for removing harmful components according to a first embodiment, which comprises a column 23 having a gas inlet 21 for introducing a gas containing a harmful component and a gas outlet 22 for the gas from which the harmful component is removed, and crystalline cupric hydroxide 24 packed in the column 23.

The gas containing harmful component is introduced through the gas inlet 21 into the column 23 to be brought into contact with the cupric hydroxide 24 packed in the column 23, and after the harmful component is removed thereby, the thus treated gas is exhausted through the gas outlet 22.

FIG. 2 shows the apparatus for removing harmful components according to a second embodiment, which comprises a column 23 having the same gas inlet 21 and gas outlet 22 as described above, the cupric hydroxide 24 packed on the inlet side of the column 23 and a metal oxide 25 packed at the outlet side of the column 23. Namely, the cupric hydroxide 24 and the metal oxide 25 are packed in the column 23 in the form of layers.

FIG. 3 shows an apparatus for removing harmful components according to a third embodiment, which comprises the same column 23 as used in FIG. 2, except that a dehydrating agent 26 is packed between the cupric hydroxide 24 and the metal oxide 25. Namely, the cupric hydroxide 24, the dehydrating agent 26 and the metal oxide 25 are packed in the column 23 in the form of layers.

Figure 4:
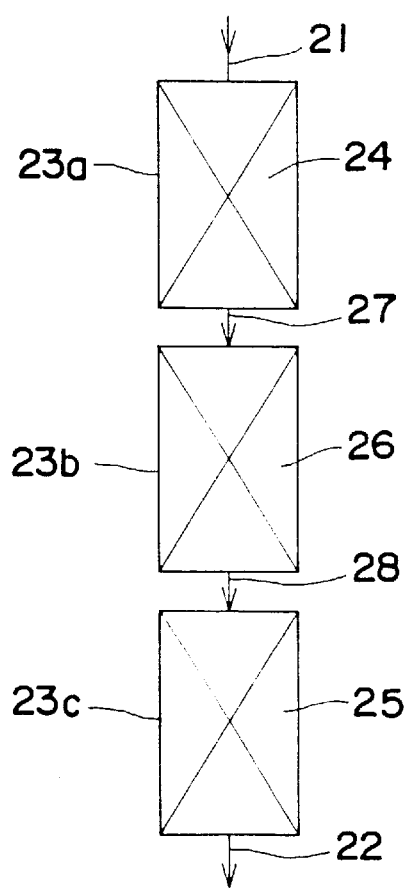

FIG. 4 shows an apparatus for removing harmful components according to a fourth embodiment, in which the column 23 as used in FIG. 3 is divided into a crystalline cupric hydroxide packing column 23a, a dehydrating agent packing column 23b and a metal oxide packing column 23c. The cupric hydroxide packing column 23a having a gas inlet 21 is connected to the dehydrating agent packing column 23b via a tube 27, and the dehydrating agent packing column 23b is connected to the metal oxide packing column 23c having a gas outlet 22 via a tube 28. The gas containing a harmful component introduced through the gas inlet 21 is brought into contact successively with the cupric hydroxide 24 in the column 23a, the dehydrating agent 27 in the column 23b and the metal oxide 25 in the column 23c in this order, and then exhausted through the gas outlet 22.

As described above, the cupric hydroxide, the metal oxide and the dehydrating agent may be packed in one column in the form of layers or may be packed individually in separate columns.

Figure 5:
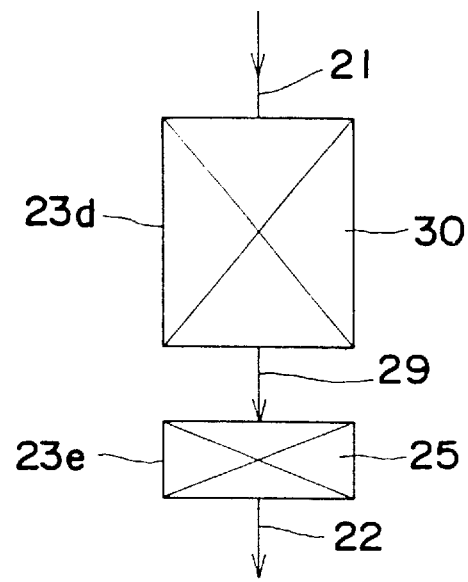

FIG. 5 shows an apparatus for removing harmful components according to a fifth embodiment, which comprises a crystalline cupric hydroxide and dehydrating agent packing column 23d having a gas inlet 21 and a metal oxide packing column 23e having a gas outlet 22, which are connected by a tube 29. The column 23d is packed with a mixture 30 of the cupric hydroxide and a dehydrating agent, whereas the column 23e is packed with a metal oxide 25.

Figure 6:
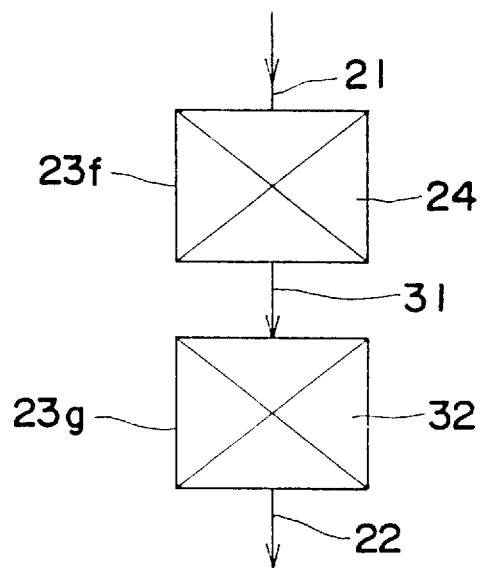

FIG. 6 shows an apparatus for removing harmful components according to a sixth embodiment, which comprises a crystalline cupric hydroxide packing column 23f having a gas inlet 21 and a metal oxide and dehydrating agent packing column 23g having a gas outlet 22, which are connected by a tube 31. The column 23f is packed with the cupric hydroxide 24, whereas the column 23g is packed with a mixture 32 of a metal oxide and a dehydrating agent.

FIG. 7 shows the apparatus for removing harmful components according to seventh and eighth embodiments of the invention. In the seventh embodiment, a mixture 33 of the cupric hydroxide and a metal oxide is packed in a column 23 having a gas inlet 21 and a gas outlet 22. In the eighth embodiment, a mixture of the mixture 33 and a dehydrating agent is packed in the column 23.

When these removing apparatuses are used exclusively as the detecting apparatuses or as the detecting and removing apparatuses, a transparent window may be provided on the column in which the cupric hydroxide is packed or a column entirely made of a transparent material such as a transparent plastic and the like shall be used.

What is claimed is:

1. A method of detecting harmful components, which comprises bringing a harmful component selected from the group consisting of hydrides of Si, P, As, B, Se and Ge and alkylates and alkoxides of B, Al, Si, P, Ti, Zn, Ga, Ge, As, Se, Zr, In, Sn and Ta into contact with a copper hydroxide; and observing color change of the copper hydroxide.

2. The method of detecting harmful components according to claim 1, wherein said copper hydroxide is combined with at least one stabilizing agent selected from the group consisting of beryllium, magnesium, vanadium, molybdenum, cobalt, nickel, zinc, boron, aluminum, silicon, lead, antimony and bismuth; and oxides, hydroxides, hydrogen-carbonates, hydrogensulfates, hydrogenphosphates, bicarbonates, bisulfates, acid phosphates, sulfides, peroxides, halides, carboxylates and oxy acid salts thereof.

* * * * *